US012129423B2

(12) United States Patent
Marinho Vianna et al.

(10) Patent No.: US 12,129,423 B2
(45) Date of Patent: Oct. 29, 2024

(54) WELL CONDITIONING METHOD FOR WIRELINE LOGGING USING DEDICATED AQUEOUS BASED DRILLING FLUID COMPOSITION

(71) Applicant: Petróleo Brasileiro S.A.—Petrobras, Rio de Janeiro (BR)

(72) Inventors: Angelo Marinho Vianna, Rio de Janeiro (BR); Walter Francisco Cardoso Junior, Niterói (BR); Fabio Fabri, Santos (BR); Sebastiao De Andrade Loureiro, Niterói (BR); Kaio Augusto Gonzaga, Santos (BR); Leonardo Silva De Almeida, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 17/957,912

(22) Filed: Sep. 30, 2022

(65) Prior Publication Data
US 2023/0104709 A1 Apr. 6, 2023

(30) Foreign Application Priority Data
Oct. 1, 2021 (BR) ...................... 10 2021 019806 0

(51) Int. Cl.
*C09K 8/12* (2006.01)
*C09K 8/10* (2006.01)
*C09K 8/26* (2006.01)

(52) U.S. Cl.
CPC .................. *C09K 8/10* (2013.01); *C09K 8/12* (2013.01); *C09K 8/265* (2013.01)

(58) Field of Classification Search
CPC .......... C09K 8/03; C09K 8/032; C09K 8/035; C09K 8/04; C09K 8/05; C09K 8/06; C09K 8/08; C09K 8/10; C09K 8/12; C09K 8/26; C09K 8/265; C09K 8/28
See application file for complete search history.

(56) References Cited

U.S. PATENT DOCUMENTS

| 5,925,598 A * | 7/1999 | Mody ..................... C09K 8/845 507/140 |
| 6,148,917 A * | 11/2000 | Brookey ............... E21B 31/035 175/69 |
| 6,290,001 B1 * | 9/2001 | West ........................ C09K 8/05 507/140 |
| 7,926,591 B2 | 4/2011 | Nguyen et al. |
| 11,214,727 B1 * | 1/2022 | Riney ...................... C09K 8/54 |

(Continued)

FOREIGN PATENT DOCUMENTS

| CA | 2516542 A1 | 9/2004 | |
| WO | WO-9117339 A1 * | 11/1991 | ............. E21B 21/12 |
| WO | 2011083318 A1 | 7/2011 | |

*Primary Examiner* — Angela M DiTrani Leff
(74) *Attorney, Agent, or Firm* — Mintz, Levin, Cohn, Ferris, Glovsky, and Popeo, P.C.

(57) ABSTRACT

The present invention addresses to a wireline logging method using an aqueous based drilling fluid with xanthan gum and polyols in order to improve the quality of the acquisition of geological data from wireline logging (final logging) in open hole and reducing the risk of the tool getting stuck. It can also be applied in well control situations and used in the integral drilling of the reservoir, but with different application bias of the multifunctional fluid.

15 Claims, 3 Drawing Sheets

(56) References Cited

U.S. PATENT DOCUMENTS

| | | | |
|---|---|---|---|
| 2004/0149431 A1* | 8/2004 | Wylie | E21B 43/103 175/57 |
| 2005/0269080 A1* | 12/2005 | Cowan | E21B 44/00 166/250.14 |
| 2019/0136110 A1* | 5/2019 | AlBahrani | C09K 8/12 |
| 2021/0238954 A1* | 8/2021 | Aker | E21B 7/04 |

* cited by examiner

WELL CONDITIONING METHOD FOR WIRELINE LOGGING USING DEDICATED AQUEOUS BASED DRILLING FLUID COMPOSITION

CROSS-REFERENCE TO RELATED APPLICATION

This application claims priority to Brazilian Application No. 10 2021 019806 0 filed on Oct. 1, 2021, and entitled "WELL CONDITIONING METHOD FOR WIRELINE LOGGING USING DEDICATED AQUEOUS BASED DRILLING FLUID COMPOSITION" the disclosure of which is incorporated herein by reference in its entirety.

FIELD OF THE INVENTION

The present invention addresses to a well conditioning method for wireline logging using a dedicated water-based drilling fluid with application in the construction and drilling of wells, in order to improve the quality of geological data acquisition and mitigate problems of the tools getting stuck.

DESCRIPTION OF THE STATE OF THE ART

Currently, in drilling with aqueous fluid, a conditioning sequence is used, initially positioning a low salinity drilling fluid, still with the string that completed the drilling. The logs that are affected by salinity and temperature are initially run, and again an intermediate conditioning is carried out to position a high salinity fluid (lower solids content) and thus the logs that depend on the quality of the well wall and are stationary are run. Invariably, also in the second conditioning, a completion fluid can be placed. However, there has been little effectiveness even in this strategy, because the risk of thick cake formation in the first runs is high, which can be verified by the history of wireline getting stuck during open holes logging. The second run with increasing salinity can introduce a new variable, which is the salinity contrast, which makes it difficult to interpret the type of fluid contained in the rock (whether invaded fluid or formation fluid). It is worth to highlight that this conditioning sequence implies an additional string maneuver for fluid replacement, resulting in longer operating time.

Aqueous drilling fluids are extensively used in the development of pre-salt wells for simplicity, lower cost and in scenarios of loss of circulation due to easy replacement. It is desirable that they contain high saline content, in order to minimize the risk of hydrate formation during a well control operation. However, this property makes the fluid more conductive and thus unsuitable for salinity and temperature sensitive logs (e.g., nuclear magnetic resonance and resistive imaging). Adapting the fluid to these logs implies reducing salinity, which requires replacing the fluid weight (specific mass) with the incorporation of solids. These solids act in the formation of the cake, which is thicker in aqueous fluids and thus adds risks of the tool getting stuck to other stationary logs and which depend on the quality of the well wall (for example: pressure measure, side rock sampling and sampling of formation fluids). As a result, the data acquisition logs are affected, impairing the quality of the information obtained and also adding risks of tools getting stuck at the bottomhole, which increases the risk of fishing, resulting in a higher cost in the construction of wells.

Document WO2011083318 discloses methods of drilling, reaming and consolidating a subsurface formation, where a drilling fluid, a reaming fluid and a consolidating agent are supplied. Aqueous fluids can be used as drilling fluids and include fresh water, salty water, brine, seawater, an aqueous fluid comprising a water-soluble organic stabilizing compound, or any other aqueous fluid that preferably does not adversely react with the other components used in accordance with this invention or the subsurface formation.

U.S. Pat. No. 7,926,591 discloses a method of drilling a wellbore through a production zone within a subsurface formation, which drilling fluid comprises a water-based consolidating emulsion, wherein the water-based consolidating emulsion comprises an aqueous liquid and an emulsion comprising an external phase of hardening agent and an internal phase of hardenable resin. Such a drilling fluid is used for the purpose of drilling at least a portion of a wellbore in the production zone and allowing the water-based consolidation emulsion to penetrate the walls of the wellbore.

Document CA2516542 refers to a method that comprises the drilling of a well with a drilling fluid, conditioning the drilling fluid, execution of gravel packing tools to the depth in a wellbore with the conditioned drilling fluid and gravel packing in a wellbore interval using a carrier fluid. Water-based fluids are most commonly used because they are more flexible, their densities, viscosities, and formation compatibilities are more easily controlled than those of oil-based fluids. The water-based gravel packing carrier fluid has favorable rheology to effectively displace the conditioned fluid and sand carrying capability for gravel packing using alternate path technology. Examples of a water-based carrier fluid include, but are not limited to, a fluid viscosified with HEC polymer (hydroxyethyl cellulose), xanthan polymer, viscoelastic surfactant (VES) or combinations thereof.

Thus, no document of the state of the art discloses a method comprising combining conditioning and fluid technology with the use of polyols such as that of the present invention.

With the purpose of solving such problems, the present invention was developed, in which well conditioning and the application of a fluid with polyols is combined, which allows better data acquisition for all logs, without the need for intermediate conditioning, with less risks of the tool getting stuck, and thus, shorter well construction time.

The present invention has the advantage of minimizing the risk of the wireline tool getting stuck, implying in the reduction of the total intervention time, since it is a recurring event, thus meaning a direct reduction in the cost of well construction. In addition, it improves data acquisition, especially of nuclear magnetic resonance logs, contributing to a better acquisition of the volume of oil in-place, directly impacting the estimation of deposits, which directly translates into valuing the potential of reservoirs. Furthermore, it presents a lower risk for well control techniques due to the thermodynamic character of hydrate inhibition.

BRIEF DESCRIPTION OF THE INVENTION

The present invention addresses to a well conditioning method for wireline logging using an aqueous-based drilling fluid with xanthan gum and polyols with the purpose of improving the quality of geological data acquisition and mitigating problems as to the tool getting stuck.

The fluid described in the present invention, used in the construction and drilling of wells, brings benefits in mitigating the risk of hydrate formation both in situations of well control, used as an inhibited fluid, and in the integral drilling of the reservoir, with the additional benefits mentioned in the previous item.

BRIEF DESCRIPTION OF DRAWINGS

The present invention will be described in more detail below, with reference to the attached figures which, in a schematic form and not limiting the inventive scope, represent examples of its embodiment. In the drawings, there are.

DETAILED DESCRIPTION OF THE INVENTION

Figure 1:
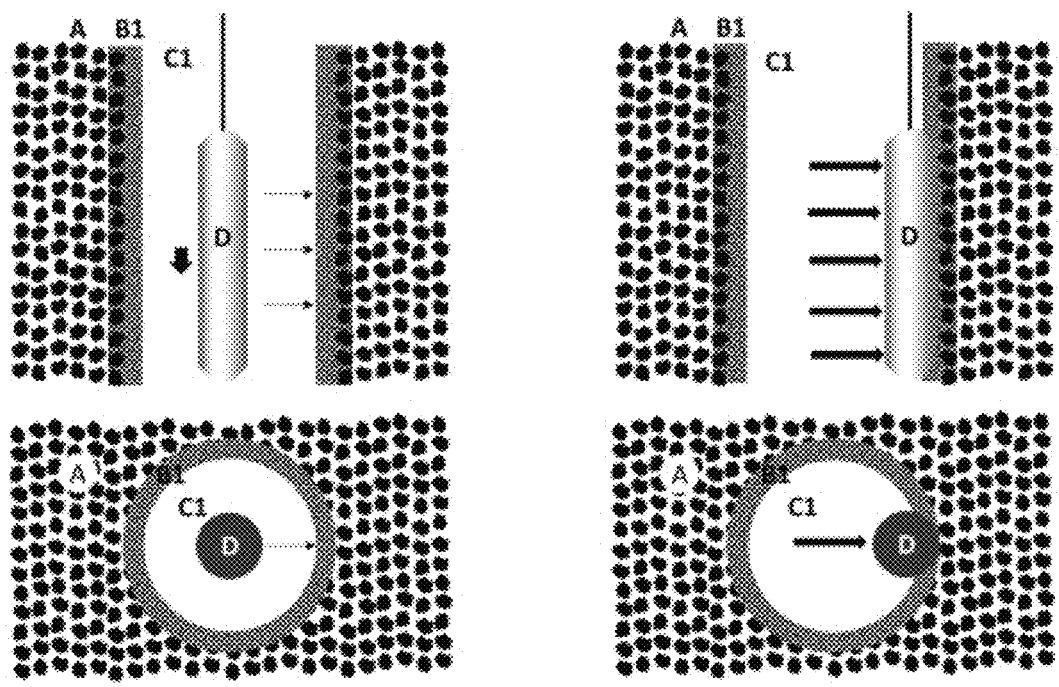
FIG. 1 shows a schematic drawing of (i) the side view of the well and (ii) the top view of the well in the logging operation with aqueous drilling fluid and the appearance of the cake and the well, where there are represented: A-permeable formation; B1-cake of aqueous drilling fluid; C1-annular space filled with aqueous drilling fluid; and D-wireline logging tool.
Figure 2:
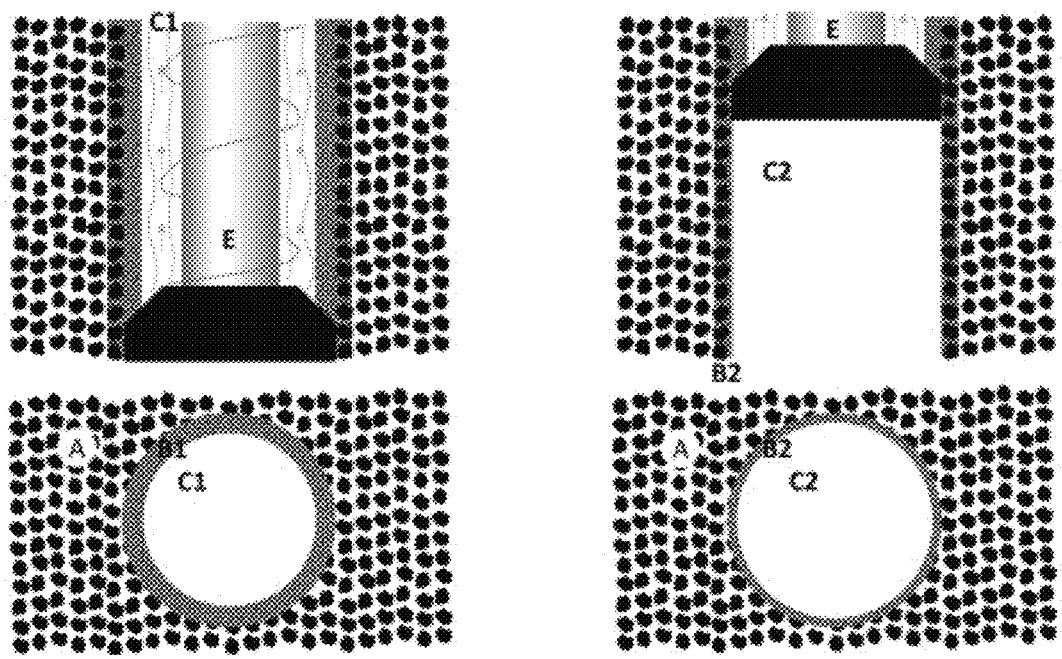
FIG. 2 illustrates the appearance of the cake and the well from (i) the side view of the well and (ii) the top view of the well after well conditioning with backreaming and simultaneous pumping of an aqueous fluid with polyols, where there are represented: A-permeable formation; B1—cake of aqueous drilling fluid; B2—cake of the aqueous fluid with polyols; C1—annular space filled with aqueous drilling fluid; C2—annular space filled with aqueous fluid with polyols; D-wireline logging tool; and E-drill string.
Figure 3:
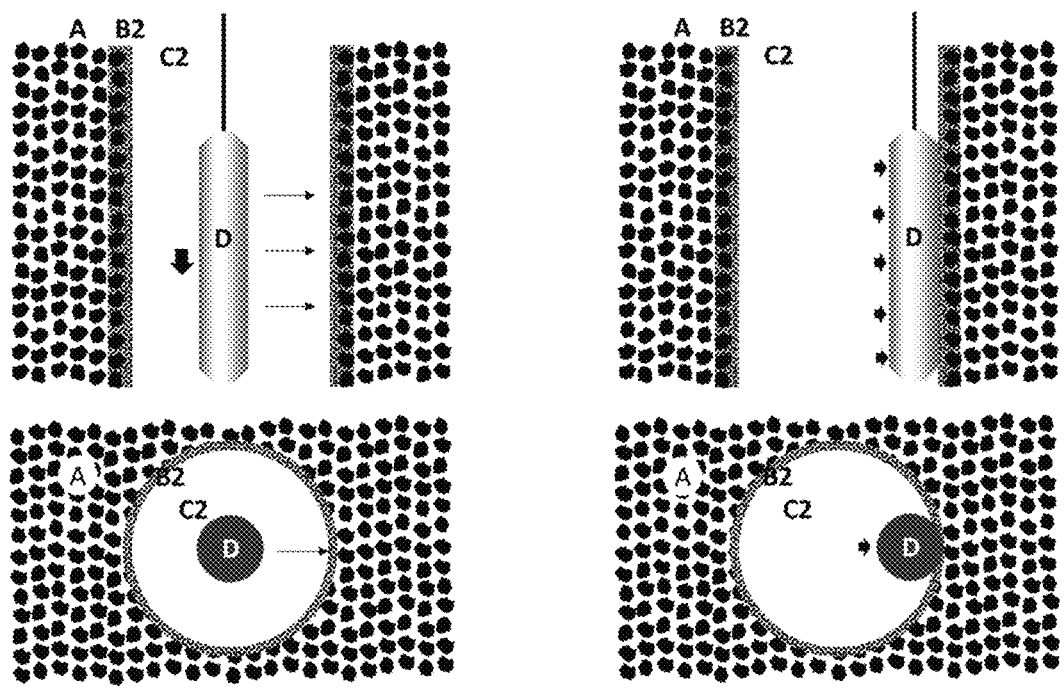
FIG. 3 shows a schematic drawing of (i) the side view of the well and (ii) the top view of the well from the logging operation with polymeric aqueous based complementary fluid (ABCF) with xanthan gum and polyols and the appearance of the cake and the well, where there are represented: A-permeable formation; B2-cake of the aqueous fluid with polyols; C2-annular space filled with aqueous fluid with polyols; D-wireline logging tool.

The method that combines technology and fluid conditioning in open holes according to the present invention comprises:
a) Preparation of the aqueous fluid with polyols according to the following steps:
a.1) Pre-hydrate the filtrate viscosifying and reducing polymers with reduced concentrations in industrial water;
a.2) Add the NaCl brine;
a.3) Add the polyol to the mixture with prehydrated polymers in a.1);
a.4) Add precipitating additive of $Ca^{++}$ and $Mg^{++}$ ions, buffer additive, alkalizing additive, and bactericidal additive, in the composition, and consider the use of defoamer, if foam formation is evidenced;
a.5) Adjust the pH in an alkaline range between 9.0 and 10.5;
a.6) Densify to a specific mass of not less than 1,000 $kg/m^3$, in the range of 1,000 to 2,000 $kg/m^3$, preferably in the range of 1,000 to 1,500 $kg/m^3$;
a.7) Carry out rheology, filtrate and salinity tests; and
a.8) Adjust the concentration of filtrate viscosifying and inhibitor polymers.

With this, the steps of conditioning the open holes and pumping fluid are carried out, verifying the considerations of speed of withdrawal of the drill string, with and without circulation, as well as the volume of fluid required during the planning of the backreaming, comprising the following steps:

b) Open holes conditioning and fluid pumping:
b.1) At the end of the drilling, pump a viscous cushion, a fluid with a rheology superior to that of the active system indicated by the viscometer reading at 3 RPM (rotations per minute) equal to or greater than 20 degrees, at the bottom and displace with aqueous fluid with polyols with the same drilling weight up to 100 m above the casing shoe of the previous phase with drilling flow rate;
b.2) Withdraw the drill string by performing backreaming by pumping aqueous fluid with polyols to the cased hole;
b.3) From the casing shoe, withdraw the drill string with circulation and without rotation by pumping the aqueous fluid with polyols at a reduced flow rate and controlled speed up to at least 200 m above the shoe or according to the availability of aqueous fluid with polyols;
b.4) At the end of pumping the aqueous fluid with polyols, pump 15 to 32 $m^3$ of viscous cushion, a fluid with a rheology superior to that of the active system indicated by the viscometer reading at 3 RPM equal to or greater than 20 degrees, and proceed with the withdrawal of the string in a cased hole by pumping the fluid from the system;
b.5) After passing the viscous cushion through the Blowout Preventer (BOP), turn on the booster;
b.6) From the pre-defined depth, complete the withdrawal of the string.

The flow rate during the backreaming may be higher, depending on the autonomy of aqueous fluid with polyols.

If there has been counteracting the loss of circulation during drilling, do not perform the backreaming in the region where there was the loss so as not to induce a new loss. In this case, it is only necessary to withdraw the string with circulation, pumping fluid with polyols.

Evaluate the parameters of ECD (Equivalent Circulating Density—equivalent specific mass of fluid circulation) and ESD (Equivalent Static Density—specific mass equivalent to the static pressure exerted by the fluid) to optimize the speed of withdrawal of the string. These parameters will subsidize the withdrawal of the string from the cased well.

The scheduled withdrawal of string without expected circulation will be an estimate based on hydraulic simulations (swab); however, the depth where the withdrawal without circulation will start as well as the maneuvering speeds will be adjusted with the ECD and ESD data of the PWD.

Once the reservoir is drilled, the string is withdrawn by positioning this aqueous fluid with polyols, in order to withdraw the cake previously formed during drilling and putting this new fluid in contact with the formation. This aqueous fluid with polyols, for having a low filtrate, provides a very effective and low thickness cake. As there is little fluid infiltration, there is no thickening of the cake over time. This is due to the high affinity (chemical interaction) of polyols for the fluid polymers (xanthan gum and PAC—polyanionic cellulose), which are polyhydroxylated saccharides.

The increase in the concentration of polyols in the cake during the filtration process is due to the partitioning phenomenon and with that the permeability of the cake reduces, which increases its effectiveness and reduces the invasion of the filtrate in the formation.

It is also considered that the fluid contains a lower solids content, due to the high density of the polyols, which provides an environment of lower risk of differential sticking, and also increases the recovery/effectiveness of side rock samples.

The high resistivity provides better resistive imaging data acquisition and for nuclear magnetic resonance data acquisition.

The fluid's characteristic of inhibiting the formation of hydrates allows the circulation of hydrocarbons in this fluid, enabling the post-sampling fluid circulation without the need for an exclusive conditioning string running down (shorter operating time).

In addition to the increase in performance in wireline logging operations, the use of this fluid only in the open hole, combined with post-drilling conditioning, reduces material and logistical costs and the risk of unforeseen demand for this fluid in the events of loss of circulation when the well is fully filled with this fluid.

Furthermore, since this fluid must be prepared prior to the logging operation, it can be used as a hydrate inhibitor in well control situations.

In table 1, below, the composition of the aqueous fluid with polyols is presented, with the description of the additives and their respective concentration ranges (minimum and maximum), with the values presented in SI system units ($kg/m^3$) and also in English units (lbm/gal).

TABLE 1

Composition of the aqueous fluid with polyols, with the description of the additives and their respective concentration ranges.

| Additive | Function | Concentration lbm/bbl Min. | Concentration lbm/bbl Max. | Concentration $kg/m^3$ Min. | Concentration $kg/m^3$ Max. |
|---|---|---|---|---|---|
| Industrial water | Continuous phase | 0.0% v/v | 54.0% v/v | 0.0% v/v | 54.0% v/v |
| NaCl brine | Weight adjustment | 26.0% v/v | 49.0% v/v | 26.0% v/v | 49.0% v/v |
| Sodium Bicarbonate | Precipitate $Ca^{++}$ and $Mg^{++}$ | 0.5 | 1.0 | 1.43 | 2.86 |
| Magnesium oxide | Buffer | 0.5 | 1.5 | 1.43 | 4.29 |
| Caustic soda | Alkalizer | 0.3 | 0.5 | 0.86 | 1.43 |
| Glutaraldehyde | Bactericidal | 0.1 | 0.3 | 0.29 | 0.86 |
| Xanthan Gum | Viscosifier | 0.7 | 1.5 | 2.00 | 4.29 |
| HPA | Filtrate reducer | 4.0 | 6.0 | 11.44 | 17.15 |
| PAC L | Filtrate reducer | 2.0 | 3.0 | 5.72 | 8.58 |
| Baritine | Densifier | 0.0 | 60.0 | 0.00 | 171.53 |
| Silicone-based emulsion | Defoamer | 0.3 | 0.5 | 0.86 | 1.43 |
| Polyol | Hydrate suppressor | 15.0% v/v | 50.0% v/v | 15.0% v/v | 50.0% v/v |

Notes:
concentration in lbm/bbl and $kg/m^3$ for and in % v/v for industrial water, NaCl brine and polyol.
Min.: minimum value, Max.: maximum value.
HPA—hydroxy-propyl-amide, PAC L—low viscosity polyanionic cellulose.

The polyols used in the formulation can have two, three or more hydroxyl groups and with two to six carbon atoms. The polyols can be selected from glycerin, monoethylene glycol, diethylene glycol, for example.

EXAMPLES

The following examples are presented in order to illustrate some particular embodiments of the present invention, and should not be interpreted as limiting the same. Other interpretations of the nature and mechanism of obtaining the components claimed in the present invention do not alter the novelty thereof.

Example 1

In table 2 below, there are presented bench results of resistivity, rheology and filtrate comparative between aqueous drilling fluid and aqueous fluid with polyols. As can be seen, the aqueous fluid with polyols performs much better than the aqueous fluid without this additive, as indicated by the higher resistivity, smaller filtrate volume and larger angles. The tests were performed in accordance with API RP 13B-1/ISO 10414-1:2008, which describes the analyses for field tests of aqueous fluids.

TABLE 2

Bench results for comparative resistivity, rheology and filtrate comparative between aqueous drilling fluid and aqueous fluid with glycerin.

| Rheology FANN 35 (rpm) | Aqueous fluid (25° C.) θ (measure of the angle) | Aqueous fluid with glycerin (25° C.) θ (measure of the angle) |
|---|---|---|
| 600 | 69 | 87 |
| 300 | 49 | 61 |
| 200 | 40 | 50 |
| 100 | 28 | 35 |
| 6 | 10 | 12 |
| 3 | 8 | 10 |
| G' | 10 | 12 |
| G'' | 17 | 20 |
| API Filtrate Volume (mL) | 4.4 | 2.6 |
| Resistivity (Ω/m) | 0.091 | 0.151 |

Key: G' - initial gel of the fluid after 10 s and G'' - final gel of the fluid after 10 min.

It should be noted that, although the present invention has been described in relation to the attached drawings, it may undergo modifications and adaptations by technicians skilled on the subject, depending on the specific situation, but provided that it is within the inventive scope defined herein.

The invention claimed is:
1. A well conditioning method comprising:
   preparing an aqueous based drilling fluid with polyols wherein preparing comprises:
      pre-hydrating filtrate viscosifying and reducing polymers water;
      adding NaCl brine to produce a mixture;
      adding polyol to the mixture;
      adding a precipitating additive of $Ca^{++}$ and $Mg^{++}$ ions, a buffer additive, an alkalizing additive, and a bactericidal additive, to the mixture;
      adjusting a pH of the mixture to be alkaline;
      densifying the mixture to a specific mass of 1,000 $kg/m^3$ to 2,000 $kg/m^3$;
      performing rheology, filtrate, and salinity tests; and
      adjusting a concentration of the filtrate viscosifying polymers and reducing polymers;
   conditioning a hole, previously formed by drilling, and pumping fluid, wherein conditioning the hole and pumping fluid comprises:
      pumping cushion into the hole and displacing the cushion with the aqueous based drilling fluid with polyols up to 100 m above a casing shoe of a previous drilling phase with a flow rate the same as a drilling fluid flowrate used during the previous drilling phase, wherein densifying comprises adjusting a weight of the mixture to match a weight of a previously used drilling fluid;

withdrawing a drill string by performing backreaming by pumping the aqueous based drilling fluid with polyols to the hole;

withdrawing the drill string from the casing shoe, with circulation and without rotation, by pumping the aqueous based drilling fluid with polyols at a reduced flow rate and controlled speed up to 200 meters above the shoe or according to an availability of the aqueous based drilling fluid with polyols;

after pumping the aqueous based drilling fluid with polyols, pumping 15 to 32 m$^3$ of a cushion and withdrawing the drill string in a section of the hole by pumping a fluid;

after passing the cushion through a blowout preventer, turning on a booster; and from a pre-defined depth, completing the withdrawal of the drill string; and conducting, after conditioning the hole, wireline logging operations within the hole with a wireline logging tool.

2. The method according to claim 1, wherein the filtrate viscosifying and reducing polymers comprise a xanthan gum viscosifier and polyanionic cellulose and hydroxy-propylamide reducers.

3. The method according to claim 1, wherein adjusting the pH to be alkaline comprises adjusting the pH to a range of 9.0 to 10.5.

4. The method according to claim 1, wherein a concentration of NaCl brine is between 26.0% v/v to 49.0% v/v.

5. The method according to claim 1, wherein the precipitating additive of Ca$^{++}$ and Mg$^{++}$ ions is sodium bicarbonate at a concentration of 1.43 to 2.86 kg/m$^3$.

6. The method according to claim 1, wherein the buffer additive is magnesium oxide at a concentration of 1.43 at 4.29 kg/m$^3$.

7. The method according to claim 1, wherein the alkalizing additive is caustic soda at a concentration 0.86 to 1.43 kg/m$^3$.

8. The method according to claim 1, wherein the bactericidal additive is glutaraldehyde at a concentration of 0.29 to 0.86 kg/m$^3$.

9. The method according to claim 1, wherein densifying comprises densifying to a specific mass in a range of 1,000 to 1,500 kg/m$^3$.

10. The method according to claim 1, the polyols comprise two to three hydroxyls and with two to six carbon atoms.

11. The method according to claim 10, wherein the polyols comprise glycerin or monoethylene glycol or diethylene glycol polyols.

12. The method according to claim 1, further comprising adding a defoamer to the precipitating additive of Ca$^{++}$ and Mg$^{++}$ ions, the buffer additive, the alkalizing additive, and the bactericidal additive.

13. The method according to claim 12, wherein the defoam defoamer is a silicone-based emulsion at the concentration of 0.86 at 1.43 kg/m$^3$.

14. The method according to claim 1, further comprising reducing a risk of the wireline logging tool getting stuck within the hole, responsive to conditioning the hole, when compared to an unconditioned hole.

15. The method according to claim 1, further comprising improving an acquisition quality of the wireline logging tool, responsive to conditioning the hole, when compared to an unconditioned hole.

\* \* \* \* \*